United States Patent [19]
Sobota

[11] 3,802,477
[45] Apr. 9, 1974

[54] MESH FABRIC MOUNTABLE ON A VEHICLE TIRE

[75] Inventor: Herbert Sobota, Warstein, Germany

[73] Assignee: Siepmann-Werke KG, Belecke/Mohne, Germany

[22] Filed: June 5, 1972

[21] Appl. No.: 259,865

[30] Foreign Application Priority Data
June 3, 1971  Germany............................. 2127493

[52] U.S. Cl..................... 152/231, 59/85, 152/171, 152/185, 152/239, 152/243
[51] Int. Cl. .......................................... B60c 27/06
[58] Field of Search ........... 152/167, 170, 171, 180, 152/185, 201, 222, 239, 243, 231; 59/84, 85, 88, 89

[56] References Cited
UNITED STATES PATENTS

| | | | |
|---|---|---|---|
| 3,696,853 | 10/1972 | Sobota et al....................... | 152/231 |
| 3,426,823 | 2/1969 | Rieger................................ | 152/231 |
| 3,490,511 | 1/1970 | Müller et al. ..................... | 152/243 |
| 1,780,864 | 11/1930 | Bull et al. ......................... | 152/243 |

*Primary Examiner*—Drayton E. Hoffman
*Attorney, Agent, or Firm*—Michael S. Striker

[57] ABSTRACT

A mesh tread strip of the fabric has the purpose of surrounding the entire tread face of the vehicle tire and two mesh side strips respectively overlie the side faces of the vehicle tire. The tread strip is composed of a plurality of substantially parallel approximately zig-zag shaped strands extending transversely of the circumference of the vehicle tire tread face and each composed of a plurality of interlinked units respectively comprising a circumferentially complete annular first member adapted to extend with its general plane substantially normal to the tread face, and at least one approximately U-shaped second member adapted to extend with its general plane substantially tangential to the tread face and to releasably engage the first member. Circumferentially complete annular linking components connect adjacent ones of the strands together in direction of the circumference of the tread.

9 Claims, 2 Drawing Figures

MESH FABRIC MOUNTABLE ON A VEHICLE TIRE

CROSS-REFERENCE TO RELATED APPLICATIONS

A related application was filed in the name of Herbert Sobota et al. on Dec. 19, 1969 under Ser. No. 886,684; it has matured into U.S. Pat. No. 3,696,853. Another related application was filed on May 17, 1972 in the name of Karl-Heinz Wessel and Herbert Sobota under the title "Protective Mesh Fabric for Vehicle Tires;" it has Ser. No. 253,926.

BACKGROUND OF THE INVENTION

The present invention relates generally to a mesh fabric, and in particular to a protective mesh fabric for surrounding the surface of a vehicle tire on which it is to be mounted.

Mesh fabrics of the type here under discussion are already known, for instance from the aforementioned related applications. They serve the purpose of protecting a vehicle tire against damage, and also to increase the resistance of the tire to slipping or sliding. They are not, however, intended to replace the so-called tire chains which are conventionally provided for the purpose of increasing the traction of a vehicle tire on icy or snowy surfaces. Protective mesh fabrics of the type herein discussed are, on the contrary, intended to protect the vehicle tire against damage and prevent its slipping under circumstances where different conditions prevail from those mentioned above, for instance where heavy vehicles with large tires must move on extremely rough terrain where sharp rocks or the like might tend to damage the tires or where the tires might tend to slip because of loose rocks or the like.

It is already known from the aforementioned art to provide a protective mesh fabric of the general type here under discussion in which a plurality of units are interlinked with one another, with each of the units being composed of a circumferentially complete annular first member adapted to extend substantially normal to the tire surface, and at least one approximately U-shaped second member adapted to extend substantially parallel or tangential to the tire surface. The first member is provided with aperture means and has an engaging portion which in part bounds the aperture means. The second member has two legs and is provided on one of these legs with an arresting portion configurated for mating engagement with the engaging portion of the first member subsequent to insertion of the one leg through the aperture means and in a sense preventing relative displacement of the aforementioned members in the general plane of the aperture means.

This type of mesh fabric is not a chain, as must be recalled for the sake of clarity; instead, it is a true mesh or net fabric, and it is also pointed out that the second member mentioned above, while identified as being approximately U-shaped, may also be of substantially G-shaped configuration for which reason the term "approximately" has been employed to make it clear that U-shaped can embrace such configuration.

In the aforementioned construction separate and readily lost components for retaining the interlinked elements together are avoided. Moreover, such components would in actual use of the respective mesh fabric be subjected to particular stresses and wear, and would readily be destroyed or become lost. Instead, the mesh fabric mentioned above assures that the cooperative components or members of the respective interlinked units will remain in their respective positions exclusively due to their configuration. This has the additional advantage that it is now impossible to assemble the members of any unit in other than the proper relationship, and the retention and securing of the members against undesired separation will take place necessarily when the members are assembled with one another to make a unit. Mistakes or improper assembly are therefore avoided.

Such a construction assures that substantial time is saved for the assembly over what is known from other prior art. In particular, at most a third of the time previously required for assembly of mesh fabrics is needed in assembling the aforementioned type of mesh fabric, given identical mesh fabric sizes. Welding is avoided, and this accounts for a large part of the time savings which are achieved. Evidently, a simple inter-engagement of the various members is simpler and can be carried out more rapidly than the previous necessary inter-engagement, bending, welding and removal of weld beads. Moreover, the necessary expensive and complicated devices and machinery previously required for carrying out the bending and welding are no longer necessary, and the substantial energy expenditure is avoided.

In addition, the aforementioned prior-art mesh fabric eliminates the need for highly trained personnel capable of carrying out the necessary operations, in particular the necessary welding. It is now simply necessary to train semi-skilled personnel to place the members together so that they inter-engage. In fact, it is very difficult to connect the members of a unit in improper relationship with one another; however, should this in fact occur, it is not very serious because the members can readily be disengaged and reassembled in proper relationship. Such a correction can therefore be made rapidly and with a minimum of expense.

A further advantage is the fact that the elimination of any necessity for welding makes it possible to use any type of steel that is suitable for the purposes at hand. It is unnecessary to recall here that certain types of steel are particularly strong and therefore particularly well suited in terms of their resistance to wear or deformation, but that on the other hand they cannot be readily welded. The necessity to weld them previously imposed limitations on the kinds of steel that could be used, and this has now been removed. Evidently, this advantageously influences the lifetime of the prior-art mesh fabric mentioned above, in that the selection of steel for making the individual members can now be made exclusively with a view towards increasing such lifetime.

Insofar as steel is used which requires any kind of heat treatment in order to obtain advantageous characteristics with respect to hardness and strength, it is no longer necessary to carry out such heat treatment after the individual members have been assembled to form the mesh fabric, as was previously the case. In the aforementioned prior-art mesh fabric it is possible to heat each individual element separately before they are assembled to form a mesh fabric, because it is no longer necessary to effect any welding which would partially or completely negate the advantageous characteristics obtained by heat treatment. Furthermore, the possibility of heat treating the members individually makes possible the use of conventional relatively small heat-treating furnaces, rather than requiring the use of very large furnaces as were previously needed to heat treat the mesh fabrics which had to be assembled before they could be so treated. Such mesh fabrics are very large because they are intended for very large tires which may be of a diameter as great as, or greater, than the height of an average man. Naturally, the smaller furnaces are less expensive to construct and to operate, especially as they can usually be used for other purposes also, or inasmuch as frequently already existing furnaces can be used for the heat treatment operations.

The advantageous prior-art mesh fabric mentioned above also no longer necessitates the manufacture of the mesh fabric in form of sections which are then connected with special connecting members. It requires, at most, the use of connecting members at a single location, namely where the two ends of the strips meet after being placed around the tire. In certain embodiments even this can be avoided because it is possible to produce the mesh fabric as an endless fabric. It is possible to use at the juncture of the two opposite ends of the mesh fabric, if the latter is not endless, completely normal members such as those of which the entire fabric is otherwise constituted, which are connected in the same manner as all other members in the mesh fabric when the latter is assembled.

It is advantageous according to the aforementioned prior-art mesh fabric if the individual members of a unit are connected with one another in a manner reminiscent of a bayonet coupling, and can be separated from one another only in a predetermined position relative to one another. This can be achieved by producing the individual members of each unit in a certain manner which is disclosed in the aforementioned copending application of Karl-Heinz Wessel and Herbert Sobota, and the members can be constructed for this purpose without any need to resort to material-removing methods, in particular by forging or casting, so that they can be produced less expensively than would otherwise be possible. The bayonet-type coupling portions can be produced so as to be rather strong and capable of withstanding substantial forces without the members undergoing permanent deformations or breaking. The engagement and disengagement of bayonet-type coupling portions is very simple so that it requires nothing more than unskilled personnel for assembling or disassembling mesh fabrics of this type. Moreover, bayonet-type coupling portions of this type assure that the individual members of a unit must assume a predetermined relative position before they can become disengaged from one another. Thus it is only necessary to assure that the members of a unit cannot unintentionally assume this predetermined position, in order to prevent unintentional disengagement without requiring any separate means for preventing such disengagement. This is achieved by having the members of adjacent units so inter-engaged with one another that no individual member of any unit can unintentionally assume a position in which it could become disengaged.

The aforementioned prior-art mesh fabric can be exclusively or predominantly assembled of the aforementioned units without requiring the use of any welded components, and this can be done for the mesh tread strip and/or the mesh side strips. The individual units may all be identical, that is they may be assembled of members having the same configuration from unit to unit, resulting in a substantial saving in the manufacture of the members required for assembling such a mesh fabric, as well as a great simplicity in the assembling of the fabric per se.

The aforementioned mesh fabric can be produced in a great variety of types and configurations, to accommodate it to the most varied operating conditions and surface conditions on which it is to be used as well as to accommodate it to the most varied tire dimensions, so that it is possible always to obtain an advantageous effect.

However, it has been found that further improvements are not only desirable but are possible.

SUMMARY OF THE INVENTION

Accordingly, it is a general object of the present invention to provide such further improvements.

More particularly it is an object of the present invention to provide a mesh fabric mountable on a vehicle tire for surrounding the surface thereof, which mesh fabric constitutes a further improvement over what is known from the prior art.

Another object of the invention is to provide such an improved mesh fabric which increases the traction afforded for a tire on which it is mounted.

Another object of the invention is to provide such a mesh fabric which is capable of withstanding even more substantial stresses than what is known from the prior art.

In pursuance of these objects, and others which will become apparent hereafter, one feature of the invention resides in a mesh fabric mountable on a vehicle tire for surrounding the surface thereof. Briefly stated, this mesh fabric comprises a mesh tread strip for surrounding the entire tread face of a vehicle tire and two mesh side strips for respectively overlying the side faces of such vehicle tire. At least the mesh tread strip is composed of a plurality of substantially parallel approximately zigzag-shaped strands each extending transversely of the circumference of the vehicle tire tread face and each composed of a plurality of interlinked units respectively comprising a circumferentially complete annular first member adapted to extend with its general plane substantially normal to the tread face, and at least one approximately U-shaped second member adapted to extend with its general plane substantially tangential to the tread face and to releasably engage the first member, and inter-engaging arresting portions provided on the members for preventing unintentional disengagement of the latter solely as a function of the configurations of the members and arresting portions. Circumferentially complete annular linking components are provided, connecting adjacent ones of the strands in direction of the circumference of the tread face.

A mesh fabric constructed in accordance with what has just been set forth above has been found to be particularly advantageous. In the first place, all of the annular first members —on which the tire is essentially supported in use— extend either transversely or at least inclined to the circumferential direction of the tire tread face, whereby the traction afforded by the mesh fabric is greatly enhanced. The first members act analogously to spikes or similar components, and the fact that they are relatively long in elongation and that the elongation is inclined transversely to the circumferential direction of the tire tread face, substantially increases the advantages achieved. Slipping of a tire provided with the novel mesh fabric is thus largely avoided, and can at most occur under extreme operating conditions of a vehicle provided with the novel mesh fabric.

In addition, the mesh fabric according to the present invention can very readily be repaired if and when damage should occur. It is, as should be specifically pointed out herein, highly resistant to wear and damage. If, however, damage should occur nevertheless to an individual member of one of the units, then this damaged member can be replaced with a new one, irrespective of where in the mesh fabric it happens to be located. No special tools or equipment are required for effecting the repair, and no special repair members or links are needed as in previous mesh fabrics. It is simply necessary to change the damaged member for a new one identical with it in configuration. Moreover, it is not necessary to remove the mesh fabric from the tire on which it is mounted, and it is even less necessary to take the mesh fabric to a special repair shop. Instead, the replacement of a damaged member with a new one is carried out right on the vehicle tire.

The great simplification of any repairs which have to be carried out on the novel mesh fabric according to the present invention, is achieved largely due to the fact that the individual strands extends transversely of the tread face circumference. This makes it possible to disassemble any individual strand of which the damaged or broken member may form a part, and to begin such disassembly at the juncture of the tread strip with that side strip to which the damaged member is closest. Thus, the minimum number of members must be disassembled in order to reach the damaged one, whereby the speed and ease of repair is greatly facilitated.

When a mesh fabric according to the present invention has indeed undergone such repair, it is completely free of any special repair elements as required in certain mesh fabrics of the prior art. The damaged or broken member has been replaced with an identical one, so that the mesh fabric will —even after a long period of use and after any number of repairs— still be composed exclusively of the same parts as when it was originally assembled, that is of parts which are of the same configuration and quality as those which have had to be replaced. This is particularly advantageous because the novel mesh fabric thus can at all times follow any movements or deformations of the tire on which it is mounted, in the same manner as when it was first mounted on the tire, which is not always possible if special repair elements are necessary because they require special connecting and/or coupling elements which need more space than a replacement member of the type here under discussion and may prevent accommodation of the fabric to the changing contours of the tire.

A further substantial advantage of the mesh fabric according to the present invention resides in the fact that it can be assembled in annular form, without requiring special connecting elements to connect its opposite ends. This means that the manufacturing expenses attendant upon the provision of such special elements are avoided, the assembly is simplified and the strength of the mesh fabric is increased, particularly in its tread strip which is of course subjected to the highest stresses in use. It is well known that special connecting elements are almost invariably the weakest links in a mesh fabric, and their elimination is thus a substantial advantage.

A mesh fabric according to the present invention can be produced in any desired length or width, and thus has the advantage that its length and/or width dimensions can be increased or decreased as desired, merely by removing (to decrease its length) the desired number of strands, or (to increase its length) by adding the desired number of strands. This means that the mesh fabric can be readily changed to accommodate it to different tires of different dimensions and configurations, and that this can be effected without any special tools or equipment. In other words, a single mesh fabric can, if necessary, be accommodated for use on different tires. It thus offers many economic advantages, for instance if it is to be used with equipment using different tire sizes or configurations, because it can be readily changed to be used with any such tire sizes or configurations, eliminating the necessity for having on hand individual sets of mesh fabrics for each tire size.

It is advantageous if the individual strands define with one another interstices of substantially hexagonal configuration, so that each interstice is surrounded by a total of six of the units, although of course other configurations are possible and intended to be encompassed within the present invention.

Generally speaking it is advantageous if the individual strands are assembled from the various units beginning at that side strip which will be mounted on the vehicle tire facing (when in use) the vehicle, rather than facing outwardly away therefrom. This has the advantage that if a repair is necessary, the strand can be disassembled beginning at that side strip which faces outwardly away from the vehicle, which is simpler than proceeding in the opposite direction. Such simplicity is particularly the result of the fact that the side of the tire facing towards the vehicle is usually less readily accessible than the other side. It will be appreciated that in order to disassemble a strand it is necessary to be capable of access to the juncture between the mesh tread strip and one of the mesh side strips. However, it is of course also possible to reverse the relationship and to begin the assembly of the strands of the mesh tread strips at that side strip which, in use on the tire on which the mesh fabric is mounted, faces outwardly away from the vehicle.

In an advantageous embodiment of the invention there is provided at only one location of at least one of the two side strips, in the region of the juncture between the side strip and the mesh tread strip, a single individual element forming a part of the side strip in question and having a bolt or screw for retaining an element which is inter-engaged with it. All other elements of the various units are inter-engaged and retained against disengagement by arresting portions which prevent unintentional disengagement solely as a function of the configurations of the members and arresting portions of the respective units.

Such a member provided with a screw or retaining bolt may be incorporated in each of the side strips and it is here that disassembly of the mesh fabric begins, if and when a damaged or broken member rquires to be replaced. If the broken member happens to be in the strand with which the element provided with the bolt is in cooperation, then the replacement can be carried out very rapidly. If it is located in another strand, then the juncture region between the respective side strip and the tread strip is disassembled, beginning at the element which is provided with the retaining bolt, until the region is reached where the damaged member is located; this still does not require a complete disassembly of the mesh fabric. Rather, only the juncture region needs to be disassembled until that strand is reached of the mesh tread strip which is damaged, and this strand is then disassembled. This means that even under the most adverse of circumstances only a single strand of the mesh tread strip need be disassembled, and at most the region of juncture between the mesh tread strip and one of the side strips has to be disassembled in part. This avoids a disassembly of the entire mesh fabric and facilitates the necessary repairs, decreasing the repair time and expense.

It is particularly advantageous if elements such as mentioned before, provided with a retaining bolt, are utilized in at least one of the mesh side strips and several locations thereon distributed over the entire length of the side strip, preferably evenly distributed in the region of the juncture between the side strip and the tread strip. Such an arrangement facilitates repairs still more, because it is now possible to come very close to the damaged member even under the most adverse of circumstances. For instance, if four of such elements are provided which are evenly spaced about the tire circumference (when the mesh fabric is installed as a tire), it is at most necessary to disassemble the juncture region between the tread strip and the side strip in question over 25 percent of the tire circumference. Thus, the amount of disassembly which has to be carried out is small and only very few units need to be taken apart. It is, in fact, possible to make the construction such that each individual strand can be separately disconnected from a respective side strip, but as a rule this is not necessary because the previously proposed solution requires so little disassembly and assembly that it is not found disadvantageous. If, however, it is desired to make each individual strand separately disengageable from a respective one of the side strips, then the strand should have no more than a single element provided with a retaining bolt or the like, so that the strand can be disengaged at one end from one or the other of the side strips. In most instances it is, however, necessary only to provide a single or very few such elements in the juncture region between one of the side strips and the tread strip. Breakage or other damage to respective members of the mesh fabric is rare in any case and if it does occur, the necessary repairs can be carried out rapidly and without any substantial difficulties even by a person having no skill in this respect.

It should finally also be mentioned that it is advantageous if at least one of the side strips is provided with a plurality of sections of substantially Y-shaped configuration which extend transversely to the tread face circumference and in at least substantial parallelism with one another, being arranged over the entire circumference and being provided with eyes through which a tensioning chain (known per se) can be passed. This substantially simplifies the production of the side strips and therefore the entire mesh fabric, as well as the maintenance of spare parts for the side strips. This latter is particularly the result of the fact that for a variety of different sizes of the mesh fabric only one and the same type of substantially Y-shaped sections need be kept in stock for use. If such a section should break, it can be readily replaced with a new one without requiring any special tool, without requiring cutting and without requiring welding. Very few different sizes of such Y-shaped sections need be kept on hand in order to be able to assemble and repair mesh fabrics according to the present invention and having the most varied dimension and configurations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
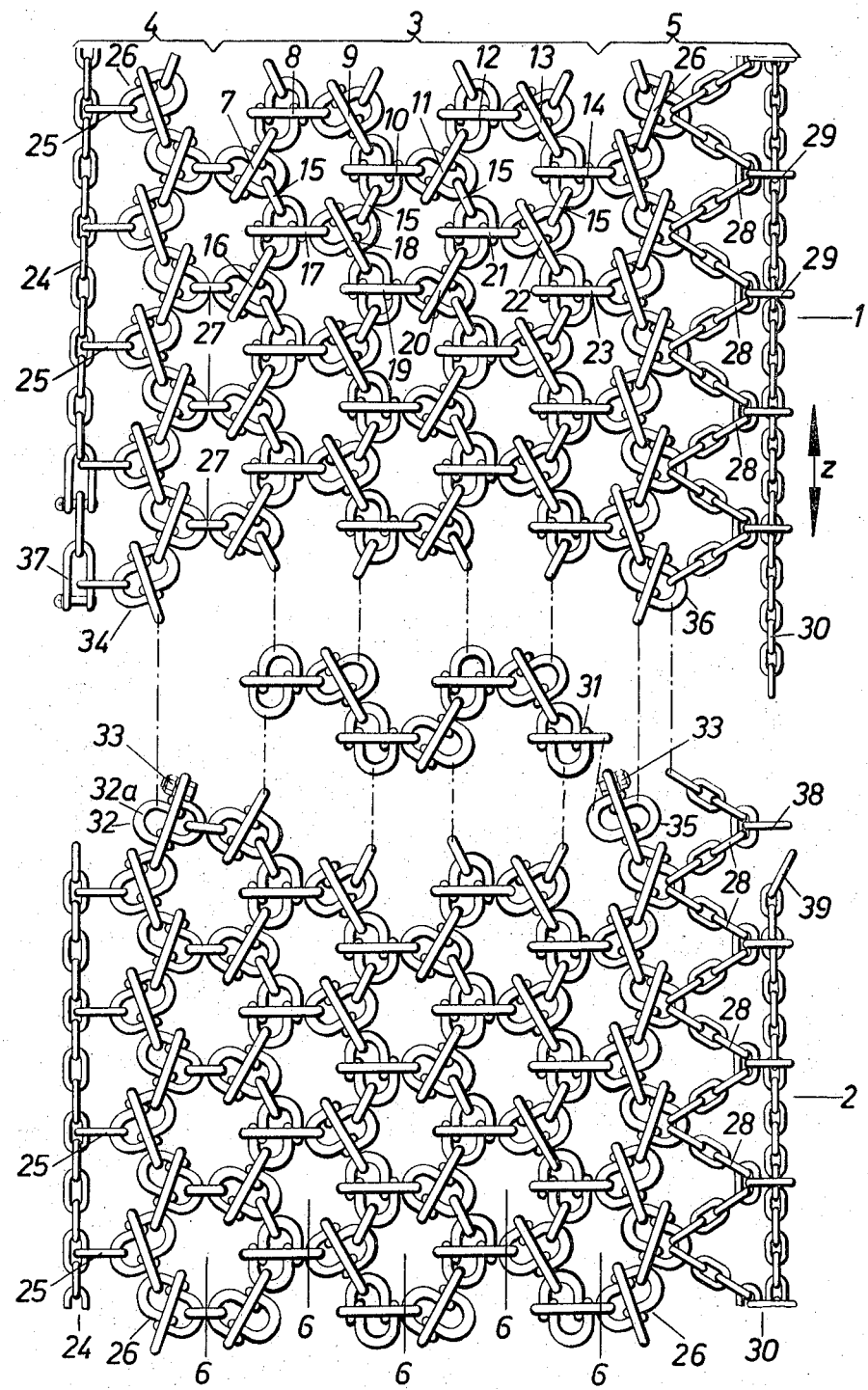
FIG. 1 is a fragmentary view of a mesh fabric according to the present invention.

Discussing the drawing in detail, and firstly FIG. 1, it will be seen that reference numerals 1 and 2 designate end portions of an elongated mesh fabric which is mountable on a vehicle tire for surrounding the surface thereof. The intermediate portion of the mesh fabric is not illustrated but it will be appreciated that in order for the end portions 1 and 2 to be positioned as shown, the fabric would have to be formed into the shape of an annulus, that is would have to assume at least substantially the configuration which it will have when mounted on the vehicle tire.

Reference numeral 3 designates the mesh tread strip which, when the fabric is mounted on the vehicle tire, surrounds the tread face of the tire, and reference numerals 4 and 5 designate the mesh side strip which are located at opposite lateral sides of the tread strip 3 and each overlie all or a part of a respective side face of the tire when the mesh fabric is mounted thereon.

The tread strip 3 is composed of a plurality of individual transversely extending strands, each composed of a plurality of interlinked units. It is particularly clearly illustrated in FIG. 1 that adjacent ones of the strands define with one another (due to the location of their respective units) interstices or mesh openings which are identified with reference numeral 6 and are of substantially hexagonal outline. The individual strands extend transversely of the elongation of the tread strip 3, in substantial parallelism and in zigzag-shaped configuration.

To facilitate an understanding of the invention, the individual units of one of these strands have been designated with reference numerals 7–14 at the top of FIG. 3. It will be seen that the strip is exclusively composed of the units 7–14, and the particular composition of each of the units from three interlinked members (basically, it could be composed of two of them) will be discussed subsequently in detail with respect to FIG. 2.

Strands which are adjacent one another, that is which follow one another in the direction of elongation of the tread strip 3, are connected with one another by circumferentially complete annular linking components 15. It will thus be seen that the units 16–23 are those which make up the strand following the one composed of units 7–14. The entire tread strip 3 is composed of such strands with adjacent ones of the strands always being connected by the linking components 15.

For convenience the side strip 4 is considered the one which, when the mesh fabric is mounted on a vehicle tire, will face towards the vehicle; it is therefore identified as the inner side strip. Conversely, the side strip 5 is identified as the outer side strip and will, when the mesh fabric is mounted on the vehicle tire, face outwardly away from the vehicle.

The side strip 4 is composed of a chain 24 to which conventional link members 25 are connected with longitudinal spacing. A side strip strand 26 is connected with the members 25 and composed of individual ones of the units of which the tread strip 3 is made up; the strand 26 extends in parallelism with the chain 24, that is in the circumferential direction $z$ of the vehicle tire surface. Conventional chain links 27 connect the strand 26 with the mesh tread strip 3.

On the other hand, the side strip 5 is similarly composed of a side strip strand 26. This, however, is not connected with the tread strip 3 in the same manner as the strip 26, namely by means of the linking elements 27. Instead, the strip 26 is connected with the tread strip 3 by having the U-shaped second members of its respective units (reference should be had to FIG. 2) inter-engage with the circumferentially complete annular first members of adjacent units of the mesh tread strip 3. For instance, such engagement takes place with the annular first members of units 14 and 23. Y-shaped sections 28 are connected with the strand 26, being provided with eyes 29 through which a tensioning chain 30 is passed which, in conventional manner, permits tensioning of the mesh fabric on the vehicle tire whereby the mesh fabric is held in place. The opposite ends of the chain 30 are connected with one another and tensioned by entirely conventional components known per se and used on all known mesh fabrics; these are therefore not illustrated.

When the mesh fabric of FIG. 1 is to be assembled so that its end portions 1 and 2 are connected and it will form an endless ring, the individual separate strand 31 shown in FIG. 1 intermediate the end portions 1 and 2 is required. To connect the end portions 1 and 2 via the strand 31, the element 32 first has its retention screw or bolt 33 removed. Now the U-shaped first member 32a can be disengaged from the remaining members of the unit 32 and can be hooked into the circumferentially completely annular first member of the unit 34 of the end portion 1. The broken line connecting the member 32a with the circumferentially complete first member of the unit 34 indicates their inter-engagement, as is done with respect to the other members of the side strips and tread strip which are to be inter-engaged with one another.

Thereupon the unit 32 is reassembled and prevented from disengagement by restoring the screw or bolt 33 to the position shown in FIG. 1. Now the individual units of the strand 31 are disengaged by disassembling their various members, beginning at the right and moving towards the left-hand end of the strand 31. Beginning now with the left-hand terminal unit of the strands 31, one of its U-shaped members is engaged, via a linking component 15, with one of the U-shaped members of the terminal strand of the end portion 1, as indicated by the broken line. The other U-shaped member of the same unit of the strand 31 is engaged with the circumferentially complete first member of the unit of the terminal strand of the end portion 2 which is adjacent to the unit 31, again as indicated by the broken line. This is continued until the final unit at the right-hand end of strand 31 is reached. The circumferentially complete annular member of this final unit is engaged with one of the U-shaped second members of the unit 35 after removal of the bolt or screw 33 thereof, and the other U-shaped member of the same unit 35 is engaged with the unit 36 of the end portion 1, as indicated in both instances by the broken lines connecting the respective members. Before the engagement of the units 35 and 36 is carried out, the section 28 adjacent the unit 36 must be connected with the same. Subsequently the screw or bolt 33 is again inserted into the unit 35, to the position shown in FIG. 1, and at this time the end portions 1 and 2 are unitarily connected, thus providing a continuous mesh fabric where the juncture between the end portions 1 and 2 can be determined only by the presence of the units 32 and 35 with the two screws 33, and the particular configuration of the circumferentially complete annular first elements of the units 32 and 35 (which configuration is dictated by the provision of the screws 33). In no other way is there any difference between this juncture and the composition of the remainder of the mesh fabric.

The chain 24 is then united at its two ends by means of the shackel 37. The (in the drawing) upper end portion of the chain 30 is then pulled through the eye 38 and through the eye 39, whereupon it is merely necessary to tension the chain 30 by means of the non-illustrated conventional tensioning elements, and to arrest its end portions against release. This of course is carried out with the mesh fabric on the tire.

If subsequently one of the units or a member of one of the units is to be replaced due to wear or breakage, then the disassembly begins at the unit 35. For this purpose the screw 33 of the unit 35 is removed and the strand 26 of the side strip 5 is taken apart until the unit is reached with connects the strand 26 with that strand in which the damaged component is located. The strand is then taken apart until the damaged component is reached, which is replaced with a new one whereupon the reassembly is carried out.

Figure 2:
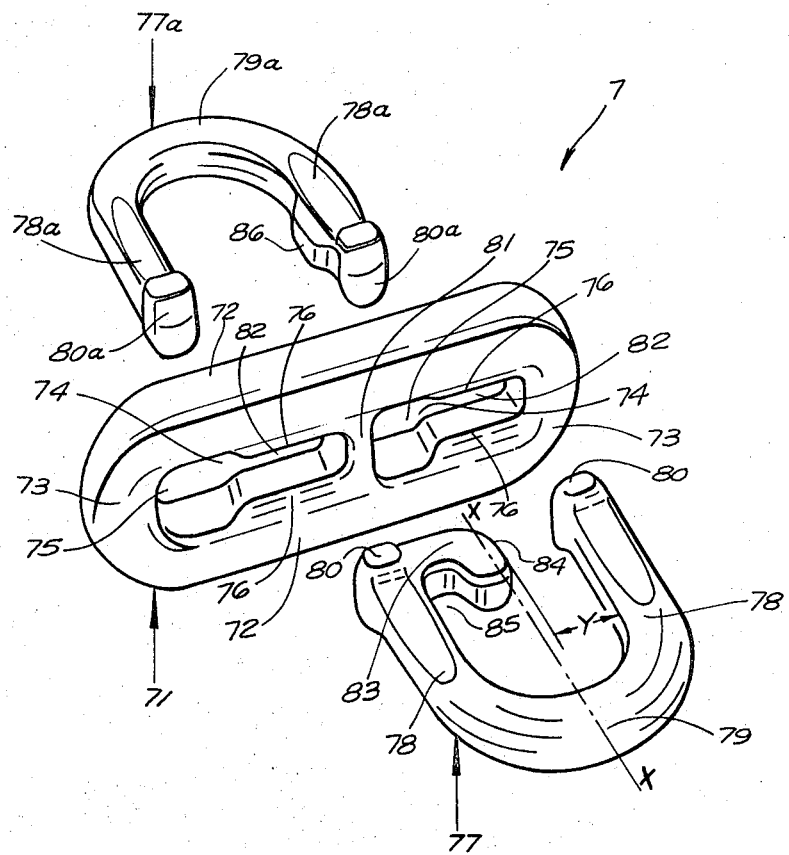
FIG. 2 is a detail view illustrating three members of one of the interlinked units of which the mesh fabric of FIG. 1 is assembled, in perspective view and in an exploded showing.

FIG. 2 shows one of the units of which the mesh fabric of FIG. 1 is assembled. These units are in accordance with the teaching of the aforementioned copending application of Karl-Heinz Wessel and Herbert Sobota and the illustration in FIG. 2 is provided herein for the purpose of better understanding. It will be seen in FIG. 2 that the exemplary illustrated unit is designated with reference numeral 7, corresponding for instance to the unit 7 in FIG. 1. Here the illustrated unit is composed of three members, namely a circumferentially complete member 71 of annular configuration, and two substantially U-shaped members 77 and 77a.

The member 71 is flat and oval, being circumferentially complete. The member 77, which is intended to be encompassed as to its configuration under the term "U-shaped," is actually in form of a stylized G, but basically it can still be considered as essentially U-shaped.

The members 77 and 77a have such configurations that they can inter-engage with the member 71 as well as with the members of respectively inter-linked adjacent units of the mesh fabric in FIG. 1. The member 71 constitutes both the coupling member and the support member on which the tire will essentially rest when the mesh fabric is placed onto the tire. Its length is approximately 2½ times to 3 times as great as its width, that is its dimension in the direction normal to the tread face of the tire and to the plane of FIG. 2. Member 71 has longitudinal portions 72 which are connected at opposite ends by curved end portions 73. Located slightly off-center with respect to the midpoint of the elongation of the member 71, the portions 72 are connected by a bridging portion 81 which constitutes an engaging portion operating with the member 77. The portion 81 separates two substantially keyhole-shaped apertures 74 each of which has a wider aperture section 75 and an approximately twice-as-long narrower aperture section 82. Above and below the sections 82 there are provided abutment and supporting surfaces 76.

In effect the member 77 constitutes an arresting and retention member, whereas the member 77a constitutes a counter member which cooperates with the member 77. The latter has two arms 78 and the member 77a has two arms 78a. The arms 78 of member 77 are connected by a curved portion 79 of substantially circular cross-section and the arms 78a are similarly connected by a curved portion 79a. The free ends of the arms 78 and 78a are respectively provided with hammerhead-shaped projections 80 and 80a which extend transversely in the general plane of the members 77 and 77a. The configuration of the projections 80, 80a is so selected that they can pass through the aperture portions 75 and will engage the surfaces 76 when they are shifted into the aperture portions 82, with the projections 80 being located at one side of the member 71 and the projections 80a at the opposite side thereof.

The arm 78 of the member 77 which in the assembled condition of the three members will be located between the arms 78a of the member 77a, is provided with a hook-shaped arresting portion 83 located in the general plane of the member 77 and extending towards the other arm 78 of the latter. The thickness of the portion 83, as measured in direction normal to the general plane of the member 77, corresponds approximately to the height of the aperture portion 82, or is slightly smaller than that height. This means that the thickness of the portion 83 is slightly smaller than the thickness of the leg 78 on which it is provided. The outer side of the portion 83, that is the side which faces the other leg 78, extends either only to or at most slightly beyond the midpoint X-X between the legs 78 of the member 77. The distance Y between this outer side and the other leg 78 —the outer side is designated with reference number 84— is at least equal to the cross-sectional diameter of the portions 73 of the member 71.

The depth of the recess in the hook-shaped portion 83, measured in parallelism with the line X-X, corresponds to approximately one-quarter to one-fifth of the depth of the recess in the member 77 between the legs 78 thereof, that is as measured along the line X-X. In turn, this latter dimension corresponds substantially to the overall dimension of the member 77, measured in direction normal to the line X-X, i.e., between the outer sides of the legs 78. The depth of the recess 85 in the hook-shaped portion 83 is advantageously equal to or slightly greater than the thickness of the bridge portion 81 and may for instance be equal to between 0.8 — 1.2 times the thickness of the portion 81.

The member 77a has the legs 78a, as mentioned before. The one leg 78a will be located adjacent the outer side 84 of the portion 83 when the members 77 and 77a are assembled with the member 71; it has an inwardly extending projection 86 which extends towards the outer side 84 and which, when the members 77 and 77a are assembled with the member 71, abuts against the outer side 84 and prevents excessive play. The normal thickness of the legs 78 and 78a is smaller than the distance between the outer side 84 and the leg 78 of the member 77 towards which the projection 83 extends, so that portions of the adjacent members 71, 77 or 77a (which are to be linked with the respective unit) can be readily inserted into this space.

It is assumed that a linking component 15, or a member 71 of an adjacent unit has been hooked over each of the members 77, 77a of the unit shown in FIG. 1, the members 77 and 77a are now to be connected with the member 71. To achieve this the members 77, 77a are moved towards one another from opposite sides of the member 71. First, the member 77 is inserted with its portions 80 through the wider aperture portions 75, whereupon the member 77 is laterally displaced to such an extent that the outer surface of the bridge portion 81 is in abutment with the hook-shaped arresting portion 83. The wider aperture portions 75 are again unobstructed and permit insertion of the projection 80a on the legs 78a of the member 77a. Once this is done the members 77 and 77a are farther displaced in the direction of the aperture 82 until the projecting nose of the hook-shaped portion 83 enters into the wider aperture portion 75 which is located adjacent the bridge portion 81 in which position the projection 86 abuts against the outer side 84 of the hook-shaped portion 83 with slight play, and thus both members 77 and 77a are connected with the bridge portion 81 in such a manner that when even slight tension is exerted upon them, as is invariably the case when the mesh fabric is placed onto the vehicle, lateral displacement of the members 77 and 77a with respect to the member 71, and vice versa, is impossible.

It is clear that the assembly of the mesh fabric shown in FIG. 1 from units such as the unit 7 illustrated in FIG. 2, is very simple, requires no skill and requires no tools.

It will be understood that each of the elements described above, or two or more together, may also find a useful application in other types of constructions differing from the types described above.

While the invention has been illustrated and described as embodied in a mesh fabric mountable on a vehicle tire, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A mesh fabric mountable on a vehicle tire for surrounding the surface thereof, comprising a mesh tread strip for surrounding the entire tread face of a vehicle tire and two mesh side strips for respectively overlying the side faces of such vehicle tire, at least said mesh tread strip being composed of a plurality of substantially parallel approximately zigzag shaped strands each extending transversely of the circumference of the vehicle tire tread face and each composed of a plurality of interlinked units respectively comprising a circumferentially complete annular first member adapted to extend with its general plane substantially normal to said tread face and at least one approximately U-shaped second member adapted to extend with its general plane substantially tangential to said tread face and to releasably engage said first member, and interengaging arresting portions provided on said members for preventing unintentional disengagement of the latter solely as a function of the configurations of said members and arresting portions; and linking means consist of circumferentially complete annular linking components connecting adjacent ones of said strands together in direction of said circumference of said tread face.

2. A mesh fabric as defined in claim 1, wherein adjacent ones of said strands define with one another a plurality of substantially hexagonal interstices.

3. A mesh fabric as defined in claim 1, at least one of said side strips comprising a plurality of substantially Y-shaped link components extending transversely to the elongation of said strips in substantial parallelism with one another and being distributed over the entire length of said strips, said link components having respective eyes; and further comprising a tensioning chain extending through said eyes longitudinally of said strips for tensioning the same when said tread strip and side strips respectively surround the tread face and the side faces of a vehicle tire.

4. A mesh fabric as defined in claim 1, one of said side strips being an inner side strip and adapted to face a vehicle when said mesh is mounted on a tire of such vehicle, and wherein each of said strands is composed of said interlinked units, beginning with that end portion of the respective strand which is connected with said inner side strip.

5. A mesh fabric as defined in claim 1, one of said side strips being an outer side strip and adapted to face away from a vehicle when said mesh is mounted on a tire of such vehicle; and wherein each of said strands is composed of said interlinked units, beginning with that end portion of the respective strand which is connected with said outer side strip.

6. A mesh fabric mountable on a vehicle tire for surrounding the surface thereof, comprising a mesh tread strip for surrounding the entire tread face of a vehicle tire and two mesh side strips for respectively overlying the side faces of such vehicle tire, at least said mesh tread strip being composed of a plurality of subsrantially parallel approximately zigzag shaped strands each extending transversely of the circumference of the vehicle tire tread face and each composed of a plurality of interlinked units respectively comprising a circumferentially complete annular first member adapted to extend with its general plane substantially normal to said tread face and at least one approximately U-shaped second member adapted to extend with its general plane substantially tangential to said tread face and to releasably engage said first member, and interengaging arresting portions provided on said members for preventing unintentional disengagement of the latter solely as a function of the configurations of said members and arresting portions, said side strips also being at least predominantly composed of said interlinked units, and at least one of said side strips being provided in the region of its juncture with said tread strip with a single link element engageable with a respective one of said interlinked units and comprising screw-threaded disengagement-preventing means; and circumferentially complete annular linking components connecting adjacent ones of said strands together in direction of said circumference of said tread face.

7. A mesh fabric mountable on a vehicle tire for surrounding the surface thereof, comprising a mesh tread strip for surrounding the entire tread face of a vehicle tire and two mesh side strips for respectively overlying the side faces of such vehicle tire, at least said mesh tread strip being composed of a plurality of substantially parallel approximately zigzag shaped strands each extending transversely of the circumference of the vehicle tire tread face and each composed of a plurality of interlinked units respectively comprising a circumferentially complete annular first member adapted to extend with its general plane substantially normal to said tread face and at least one approximately U-shaped second member adapted to extend with its general plane substantially tangential to said tread face and to releasably engage said first member, and interengaging arresting portions provided on said members for preventing unintentional disengagement of the latter solely as a function of the configurations of said members and arresting portions, said side strips also being at least predominantly composed of said interlinked units, and at least one of said side strips being provided at a plurality of longitudinally spaced locations in the region of its juncture with said tread strip with respective link elements engageable with said interlinked units and comprising screw-threaded disengagement preventing means; and circumferentially complete annular linking components connecting adjacent ones of said strands together in direction of said circumference of said tread face.

8. A mesh fabric as defined in claim 7, wherein longitudinally adjacent ones of said link elements are equidistantly spaced from one another.

9. A mesh fabric as defined in claim 7, wherein the number of said link elements at most corresponds to the number of said strands, and wherein the respective strands are at most associated with one each of said link elements.

* * * * *